United States Patent [19]
Murphy

[11] 3,819,529

[45] June 25, 1974

[54] IMIDAZOLE STRIPPING COMPOSITION AND METHOD

[75] Inventor: Donald P. Murphy, Madison Heights, Mich.

[73] Assignee: Oxy Metal Finishing Corporation, Warren, Mich.

[22] Filed: Jan. 17, 1973

[21] Appl. No.: 324,277

[52] U.S. Cl............... 252/156, 252/158, 252/162, 252/173, 252/364
[51] Int. Cl....... C11d 7/06, C11d 7/12, C11d 7/14, C11d 7/16, C11d 7/32
[58] Field of Search .......... 252/156, 158, 356, 364, 252/170, 173, 162; 260/309.6, 309

[56] References Cited
UNITED STATES PATENTS

| | | |
|---|---|---|
| 2,528,378 | 10/1950 | Mannheimer ............... 260/309.6 |
| 2,773,068 | 12/1956 | Mannheimer ............... 252/356 |
| 3,031,408 | 4/1962 | Perlman et al ............... 252/158 |
| 3,138,610 | 6/1964 | Buc ............... 252/364 |
| 3,484,379 | 12/1969 | Mankowich ............... 252/156 |
| 3,652,581 | 3/1972 | Spaenig et al. ............... 260/309 |

Primary Examiner—Ralph S. Kendall
Assistant Examiner—Jacqueline Ware
Attorney, Agent, or Firm—Arthur E. Kluegel; Marvin Trimas; B. F. Claeboe

[57] ABSTRACT

Disclosed is a method and composition useful for stripping organic coatings. The stripping composition is phenol-free and contains an alkyl or aryl substituted imidazole in an aqueous alkaline solution and stripping is effected by contacting the surface with the solution.

5 Claims, No Drawings

3,819,529

IMIDAZOLE STRIPPING COMPOSITION AND METHOD

BACKGROUND OF THE INVENTION

This invention relates to a composition and method for removing protective organic coatings from surfaces and more particularly it relates to a novel additive for increasing the effectiveness of alkaline stripping compositions.

In the manufacture of various commercial articles, it is often the practice to provide such articles with a protective and/or decorative organic coating on the surface. The coatings applied include paints, varnishes, lacquers and the like, and are formulated from numerous and diverse components, including acrylic resins, epoxy resins, vinyl resins, alkyd resins, and the like.

In the course of manufacturing these commercial articles, it sometimes happens that some of the articles fail to meet the manufacturing specification because of some defect in the protective and/or decorative coatings which are applied. When this happens, it is desirable to remove the defective coating, e.g., paint, from the article so that it may be recoated rather than discarded or sold as a "second," with the resulting financial loss. In recent years, however, great improvements have been made in both the durability and adhesion of paints and similar protective coatings so that their removal from a surface after they have been applied, cured and/or dried, has become increasingly difficult. These difficulties have been encountered particularly when using chemical means to effect the removal of the coatings, such chemical removal methods generally being preferred because they tend to limit costly hand operations and are more readily adapted to a continuous process.

Not only is it desirable to remove the paint on articles from which the coating is defective, but, additionally, where the articles being coated are transported on a conveyor line, the hooks which support the article also become coated with the paint or similar coating during the process. Since these hooks or hangers are repeatedly introduced into the painting zone of the process, the paint continues to build up on them adding weight to the conveyor line and often filling in the hook, if it is not periodically stripped off or removed. Accordingly, it is desirable to remove such protective coatings from these hooks or hangers as well as from defective articles, quickly and completely, and preferably by using chemical means.

In the past, considerable use has been made of alkaline stripping compositions in which the article from which the protective coating is to be removed is immersed for a period of time sufficient to effect a substantial loosening of the coating. With the advent of improved paint systems, such as the acrylic paints and lacquers, difficulties have often been encountered with such alkaline stripping compositions. Frequently, it has been found that the articles must be immersed in a boiling alkaline stripping composition for several hours in order to obtain the desired loosening of the protective coating. In some instances, even longer contact times have not resulted in an appreciable loosening of the coating.

U.S. Pat. No. 3,615,827 suggests an alkaline stripping composition containing a polyalkylene glycol and ethylene glycol monophenyl ether, a phenol derivative. Since phenol compounds have come under the increasing scrutiny of environmental interests and administrations of the Occupational Safety and Health Act, it would be desirable to eliminate their use. U.S. Pat. Nos. 3,663,447, 3,663,476, and 3,671,465 disclose stripping compositions containing nitrogen compounds; but only as additives for glycol or phenol systems.

SUMMARY OF THE INVENTION

It is an object of the present invention to provide an improved composition and method for removing protective and/or decorative organic coatings from surfaces to which they have been applied.

It is another object of this invention to provide a stripping composition which does not depend upon environmentally objectionable phenol derivatives for its efficacy.

Broadly, the invention includes an accelerator which comprises the essential organic components of the invention, a concentrate composition which comprises the accelerator with or without a minor portion of water, and an aqueous working composition comprising the concentrate composition diluted with water to the desired working concentration.

Accordingly, the present invention includes a concentrate composition useful for removing organic coatings which comprises one or more inorganic alkaline materials and an accelerator. The accelerator contains an alkyl or aryl substituted imidazole. Such compositions, when dispersed in water, are found to give excellent results in removing or substantially loosening decorative and/or protective films, such as paints and the like, from metal surfaces to which they have been applied. These compositions are particularly effective in removing coating materials containing acrylic, epoxy, vinyl, or alkyd resin coating components, which coating materials have heretofore been removed, if at all, only with great difficulty when using conventional alkaline paint strippers. In the following description, all percentages are by weight unless otherwise specified.

DETAILED DESCRIPTION OF THE INVENTION

In formulating the aqueous alkaline paint stripping compositions of the present invention, the concentrate compositions, described above, may be dissolved in water in amounts sufficient to provide the desired alkalinity to effect substantial loosening of the paint film to which the composition is applied, but in amounts insufficient to exceed the maximum solubility of the accelerator composition in the solution. In this regard, it has been found that the solubility of the accelerator composition is inversely proportional to the alkalinity of the stripping solution, so that at lower alkalinities, more of the accelerator composition can be dissolved in the stripping solution. Typically, the aqueous alkaline paint-stripping solutions of the present invention will contain the concentrate composition in amounts within the range of about 0.5 pounds to about 5 pounds per gallon of solution, with amounts within the range of about 1 pound to about 3 pounds per gallon being preferred. Where the acceleration has not been combined with the alkaline material they may be separately added to form the stripping solution in amounts as have been indicated hereinabove. In its most preferred embodiment, the aqueous alkaline paint stripping solution contains the alkaline material in an amount of about 1 to 2 pounds per gallon and the accelerator composition in an amount of up to (10 percent by volume) of the stripping solution.

In utilizing the stripping compositions of the present invention, the aqueous alkaline stripping solution, formulated as has been indicated hereinabove, is brought into contact with the article from which it is desired to remove paint or a similar protective or decorative coating. The contact time needed to effect a substantial loosening of the paint from the surface will depend on the nature and thickness of the paint which is to be removed. With some paint, contact times of a few minutes, e.g., 2 to 3 minutes, may be sufficient while with other and more difficult-to-remove paints, appreciably longer contact imes, e.g., 30 minutes or more, may be desirable. Accordingly, it is not feasible to give specific contact times because the times of contact used will, in each instance, be those which will effect a substantial loosening of the paint on the surface.

In this regard it is to be noted that it is not essential that the stripping composition of the present invention remain in contact with the coated surface for a period of time sufficient to effect complete removal of the coating from the surface. It is only necessary that the contact time be sufficient to effect a loosening of the paint film on the surface so that it may be removed by brushing, high-pressure water sprays, or the like. Generally, it is desirable that the contact between the stripping composition and the surface from which the coating is to be removed is effected by immersing the surface in the stripping solution. In this manner, a thorough and continuous wetting of the surface film by the stripping solution is obtained, with little or no loss of the stripping solution. In some instances, however, particularly when less difficult-to-remove films are to be treated which normally require only short contact times, other contacting techniques such as spraying, flooding, or the like, may be utilized.

Normally, the paint-stripping solution is at an elevated temperature of at least 120° F when it is brought into contact with the surfaces from which the protective film is to be removed. Preferably, the solution is at a temperature which is close to its boiling point with temperatures within the range of about 90° to about 100° C being typical. It will be appreciated, however, that in some instances either higher or lower temperatures, e.g., room temperature may also be used.

After the protective film on the surfaces treated has been substantially loosened by contact with the stripping solution, and the film has been removed from the surface, either by retaining the surface in the stripping solution until removal is complete or by utilizing other techniques on the loosely adhering film, the surface is in condition to be recoated with a new protective film. Generally, it is preferred that the surface be water rinsed so as to remove any of the alkaline stripping solution which may be retained on the surface prior to again subjecting the surface to the coating operation. It has been found that by using the aqueous alkaline stripping solutions described above, in the manner which has been indicated greatly improved results are obtained in terms of reduction in the time required to effect a substantial loosening of many different types of protective film such as paints, lacquers, varnishes, and the like.

The accelerator of this invention comprises an alkyl or aryl substituted imidazole. Such compounds have proved to be more efficient alone than even many known combination accelerators. Examples of suitable imidazoles include the ethyl, propyl, and phenyl substituted compounds. Aryl and alkyl groups of up to 6 carbon atoms may be substituted to give the desired derivatives. Preferred are the 2-substituted ethyl and propyl imidazoles.

The following example demonstrates the stripping ability of the working solution of the present invention. In each case, the test panels were first treated with a phosphating solution to form an iron phosphate coating. Thereafter, the panels were painted with Duracron 200 brand acrylic based paint supplied by PPG Industries. The paint thickness was uniform at about 1.1–1.5 mils for all panels. The panels were subsequently subjected to the stripping solution at a temperature between 90° – 100°C and the time for complete stripping was recorded. The stripping times are averages for at least 3 runs.

EXAMPLE

| ACCELERATOR | STRIPPING TIME MINUTES- |
|---|---|
| 1-ethyl imidazole | 12.5 |
| 2-ethyl imidazole | 4.4 |
| 2-isopropyl imidazole | 6.8 |
| 2-phenyl imidazole | 12.4 |

The accelerator makes up from 3–50 percent of the concentrate composition (0.15–20 percent of the aqueous working solution). The concentrate composition also comprises from 50–97 percent alkaline material. A major portion of the alkaline material is an alkali metal hydroxide. More specifically, the alkaline material of the present invention contains an alkali metal hydroxide, as the principal source of alkalinity in an amount of at least about 50 percent by weight of the alkaline material. Desirably, the alkali metal hydroxide is present in an amount within the range of about 70 percent to about 97 percent by weight of the composition.

The aqueous working solution contains components equivalent to a 0.5 to 5 lb./gal. solution of the concentrate in water and preferably 1.0 to 3 lb./gal.

In addition to the alkali metal hydroxide, the alkaline materials which are dispersible in water to form the present paint stripping solution may also contain other alkaline components if desired. Such alkaline compositions may include the alkali metal carbonates, alkali metal silicates, alkali metal phosphates, and the like.

Exemplary of the alkali metal phosphates which may be used in the composition are trisodium phosphate, tetrasodium pyrophosphate, tetrapotassium pyrophosphate, sodium tripolyphosphate, and the like. Typically, these latter alkaline materials, the alkali metal silicates, carbonates and phosphates, will be present in the concentrate composition, when used, in amounts up to about 50 percent by weight of the composition with amounts within the range of about 3 percent to about 30 percent by weight of the composition being preferred. It is to be understood that the foregoing amounts refer to the total of all alkaline material other than the alkali metal hydroxides, which totals may be made up of only one of the added alkaline materials or of a mixture of two or more of these materials.

It is to be appreciated, of course, that as used in the specification and claims, the term "alkali metal" is intended to refer to lithium, sodium, potassium, cesium, and rubidium. In many instances, the preferred alkali metal has been found to be sodium so that primary reference hereinafter will be made to the compounds of sodium. This is not, however, to be taken as a limitation of the present invention but merely as being exemplary thereof.

In addition to the alkaline materials indicated hereinabove, the concentrate compositions of the present invention may also include a gluconic acid material. Such material is typically present in the composition in an amount up to about 10 percent by weight of the composition with amounts within the range of about 2 percent to about 7 percent by weight of the composition being preferred. It is to be understood that by the term "gluconic acid material" it is intended to refer to and include gluconic acid itself, water-soluble and/or water-dispersible forms of gluconic acid such as the alkali metal gluconates and in particular sodium gluconate, glucono-delta-lactone, and the like.

Surface active or wetting agents may also be included in the concentrate composition, typically in amounts up to about 10 percent by weight of the composition with amounts within the range of about 1.0 percent to about 7 percent by weight of the composition being preferred. Various suitable surface-active agents of the anionic, nonionic and cationic types may be used, provided they are soluble and effective in solutions having a high alkalinity. In many instances, excellent results have been obtained when using wetting or surface-active agents of the phosphate ester type and, accordingly, these materials are preferred. Materials of this type are exemplified by QS-44, a product of the Rohm and Hass Company. Additionally, sulfated fatty acid derivatives and sulfonated fatty acid amide derivatives as described in U.S. Pat. Nos. 2,773,068 and 2,528,378, may be used. Exemplary of these materials are Miranol JEM and Miranol $C_2M$ products of the Miranol Chemical Company.

What I claim is:

1. A concentrate composition useful in removing an organic coating from a surface comprising about 3–50 wt. percent of an accelerator consisting essentially of an imidazole substituted with at least one alkyl or aryl group of not more than six carbon atoms and about 50–97 wt. percent of an inorganic alkaline material selected from the group consisting of the alkali metal hydroxide, carbonates, silicates and phosphates.

2. The composition of claim 1, wherein said substituted imidazole is selected from the group of imidazoles consisting of 1-ethyl, 2-ethyl, 2-isopropyl, and 2-phenyl.

3. The composition of claim 1, consisting essentially of the concentrate of claim 1 in a concentration between 0.5 and 5.0 lb/gal in water.

4. A method of removing an organic coating from the surface of an article, comprising contacting said surface with the composition of claim 3 for a period of time sufficient to effect a substantial loosening of the coating.

5. The method of claim 4, wherein said composition is maintained at a temperature between 120°F and the boiling point of the solution.

* * * * *